(12) United States Patent
Nicolas

(10) Patent No.: US 7,229,087 B2
(45) Date of Patent: Jun. 12, 2007

(54) REAR AXLE ASSEMBLY FOR AN AUTOMOBILE

(75) Inventor: Daniel Nicolas, Montesson (FR)

(73) Assignee: Peugeot Citroen Automobiles S.A., Velizy Villacourblay (FR)

( * ) Notice: Subject to any disclaimer, the term of this patent is extended or adjusted under 35 U.S.C. 154(b) by 435 days.

(21) Appl. No.: 10/488,599

(22) PCT Filed: Jun. 18, 2002

(86) PCT No.: PCT/FR02/02101

§ 371 (c)(1),
(2), (4) Date: Aug. 27, 2004

(87) PCT Pub. No.: WO03/022608

PCT Pub. Date: Mar. 20, 2003

(65) Prior Publication Data

US 2004/0262985 A1 Dec. 30, 2004

(30) Foreign Application Priority Data

Sep. 7, 2001 (FR) .................................. 01 11611

(51) Int. Cl.
  *B60G 9/04* (2006.01)
(52) U.S. Cl. ........................... 280/124.13; 280/124.166
(58) Field of Classification Search ........... 280/124.13, 280/124.125, 124.127, 124.128, 124.153, 280/124.166
See application file for complete search history.

(56) References Cited

U.S. PATENT DOCUMENTS

| 3,773,349 A | 11/1973 | Boyd |
| 4,625,995 A * | 12/1986 | Aubry et al. ......... 280/124.128 |

FOREIGN PATENT DOCUMENTS

| DE | 39 12 520 | 10/1990 |
| EP | 0 098 812 | 1/1984 |
| EP | 0 197 850 | 10/1986 |
| EP | 0 292 392 | 11/1988 |
| EP | 0 649 764 | 4/1995 |
| FR | 1 219 862 | 3/1960 |
| FR | 2 738 190 | 3/1997 |
| FR | 2 810 273 | 12/2001 |
| WO | WO 97/12770 | 4/1997 |

* cited by examiner

*Primary Examiner*—Eric Culbreth
(74) *Attorney, Agent, or Firm*—Leydig, Voit & Mayer, Ltd.

(57) ABSTRACT

The invention concerns a motor vehicle rear train comprising longitudinal trailed arms with transverse retaining links. The rear train comprises support component fixed on a crosspiece, and two substantially transverse retaining links each of which includes one end fixed to the support component by an articulation and its opposite end fixed to a corresponding wheel pivot (9) by an articulation, each retaining link being designed to have a variable length depending on the vertical travels of the wheel whether it is driven or in free play.

12 Claims, 4 Drawing Sheets

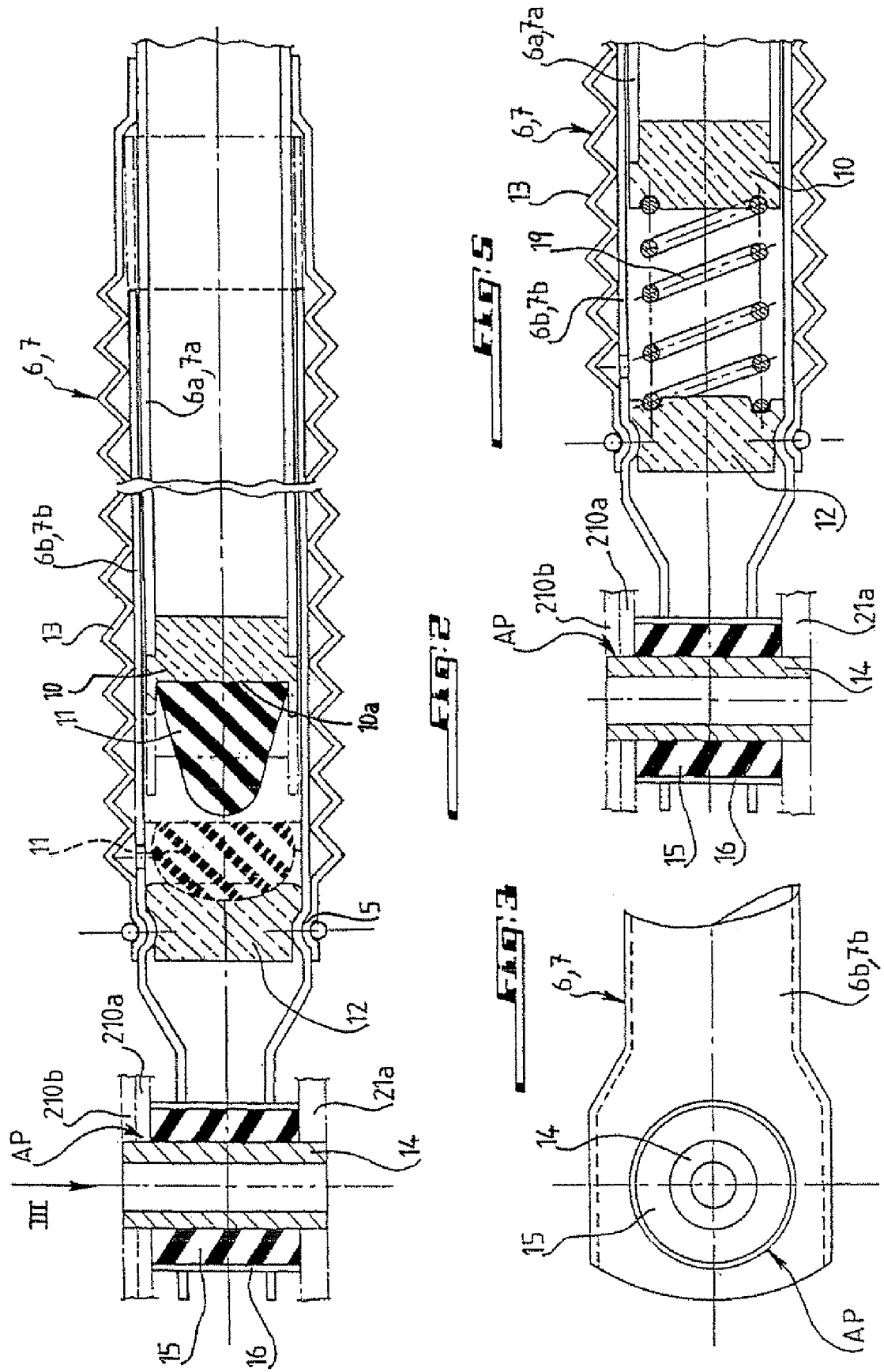

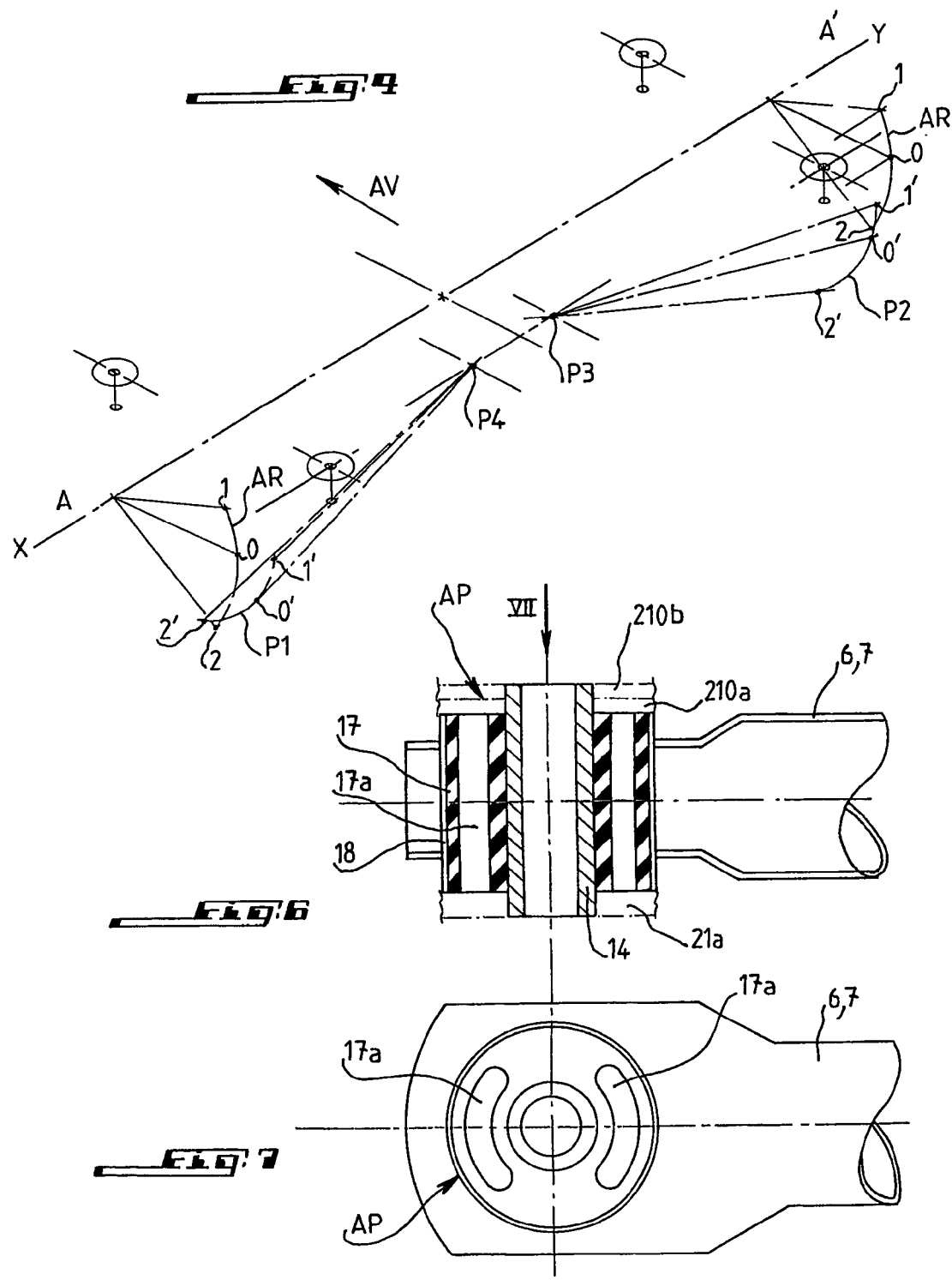

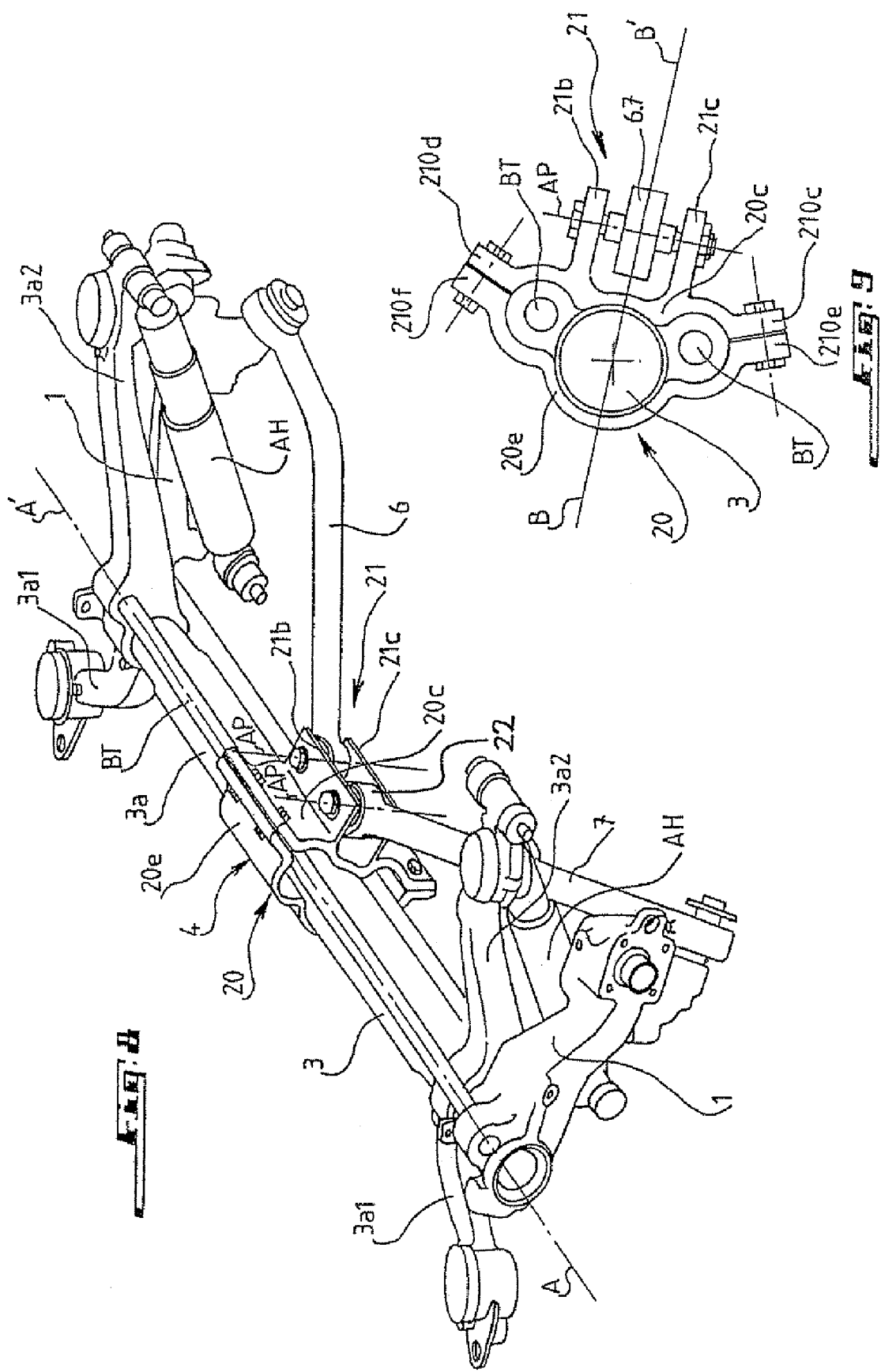

REAR AXLE ASSEMBLY FOR AN AUTOMOBILE

The present invention relates to a rear axle assembly for an automobile, of the type with two longitudinally extended arms.

According to such a rear axle assembly, the two extended support arms for the wheel stub axles are connected together by a tubular cross member the body of which is attached to the vehicle body by two front legs and two rear legs integral with the support arm body and connected to the vehicle body by elastic connections in the form of blocks. Each extended arm is mounted so as to pivot at the corresponding end of the cross piece around a transverse axis via a needle bearing in order to allow the oscillation in the vertical plane of each rear wheel.

The design of this rear axle assembly makes it difficult to stop induced deflections of the axle assembly under large transverse forces because of the elasticity of the blocks for connecting the extended arms to the vehicle body and above all because of the deformation of the wheel supports, in particular of the extended arms themselves.

Thus, the problem that the invention is trying to solve lies in the elimination of the bending moments on the extended arms of the rear axle assembly in the case of severe transverse forces applied to it.

In order to solve this problem, the invention proposes a rear axle assembly for an automobile, having two longitudinally extended arms for support of the wheel stub axles, connected together by a cross member attached to the vehicle body by front and rear legs connected to the vehicle body by elastic connections, and mounted so as to pivot at the corresponding end of the cross member around a transverse axis, and which is characterized by the fact that it has a support part rigidly attached essentially in the middle of the tubular cross member; and two essentially transverse retaining bars, each of which has one end attached to the support part by an articulation and its opposite end attached to the corresponding wheel pivot by an articulation, each retaining bar being arranged in such a way as to have a variable length depending on the vertical oscillations of the wheel in the driven state and in the released state.

According to an advantageous aspect of the invention, the support part has a body for attachment to the cross member and a piece essentially in the form of a stirrup for support of the articulations of the two retaining bars, integral with the attachment body and situated to the rear of the cross member.

According to a first embodiment, the attachment body can enclose the cross member and can be attached to it by two flanges situated under the cross member in the vertical plane passing through the axis of the cross member, one of the attachment flanges defining one of the limbs of the stirrup-shaped piece.

Preferably, in this first embodiment, the attachment body can have two half-shells enclosing the cross member, and the wall of the stirrup-shaped piece behind the cross member can be integral with the rear half-shell of the attachment body.

According to a second embodiment, the attachment body can have two loose half-shells enclosing the cross member and attached to it by two pairs of flanges respectively belonging to the two half-shells.

Preferably, in this second embodiment, the stirrup-shaped piece has two parallel flat plates whose median plane passes through the axis of the cross member.

According to a first embodiment, each retaining bar has, at its end connected to the support part, two telescoping elements, an external one and an internal one, respectively comprising two fixed transverse end stops between which a flexible component is supported that can be compressed axially when the wheel oscillates vertically in the driven state.

According to an embodiment variant, the flexible component is a helical compression spring.

According to another embodiment variant, the flexible component is a truncated conical rubber block integral with the end stop of the internal telescoping element.

The external telescoping element of each retaining bar is connected at its end to the support part by the corresponding elastic or ball-and-socket joint.

According to a second embodiment, the joint connecting each retaining bar to the support part is flexible and has a rubber-based sleeve with a longitudinal axis parallel to the longitudinal axis of the vehicle and having two diametrically opposed internal cavities allowing radial deformation of the sleeve during vertical oscillations of the wheel.

Advantageously, each of the cavities has the form of an arc-shaped hole in cross section.

Preferably, the support part is a cast piece made of aluminum.

The invention will be better understood, and other aims, characteristics, details and advantages of it will appear more clearly in the following explanatory description given with reference to the appended drawings only by way of example, illustrating two embodiments of the invention, and in which:

FIG. 2 is an enlarged partial section of the end of one of the two retaining bars, according to a first embodiment of the invention, which are used in the rear axle assembly of FIG. 1;

FIG. 3 is a partial top view according to arrow III of FIG. 2;

Figure 1:
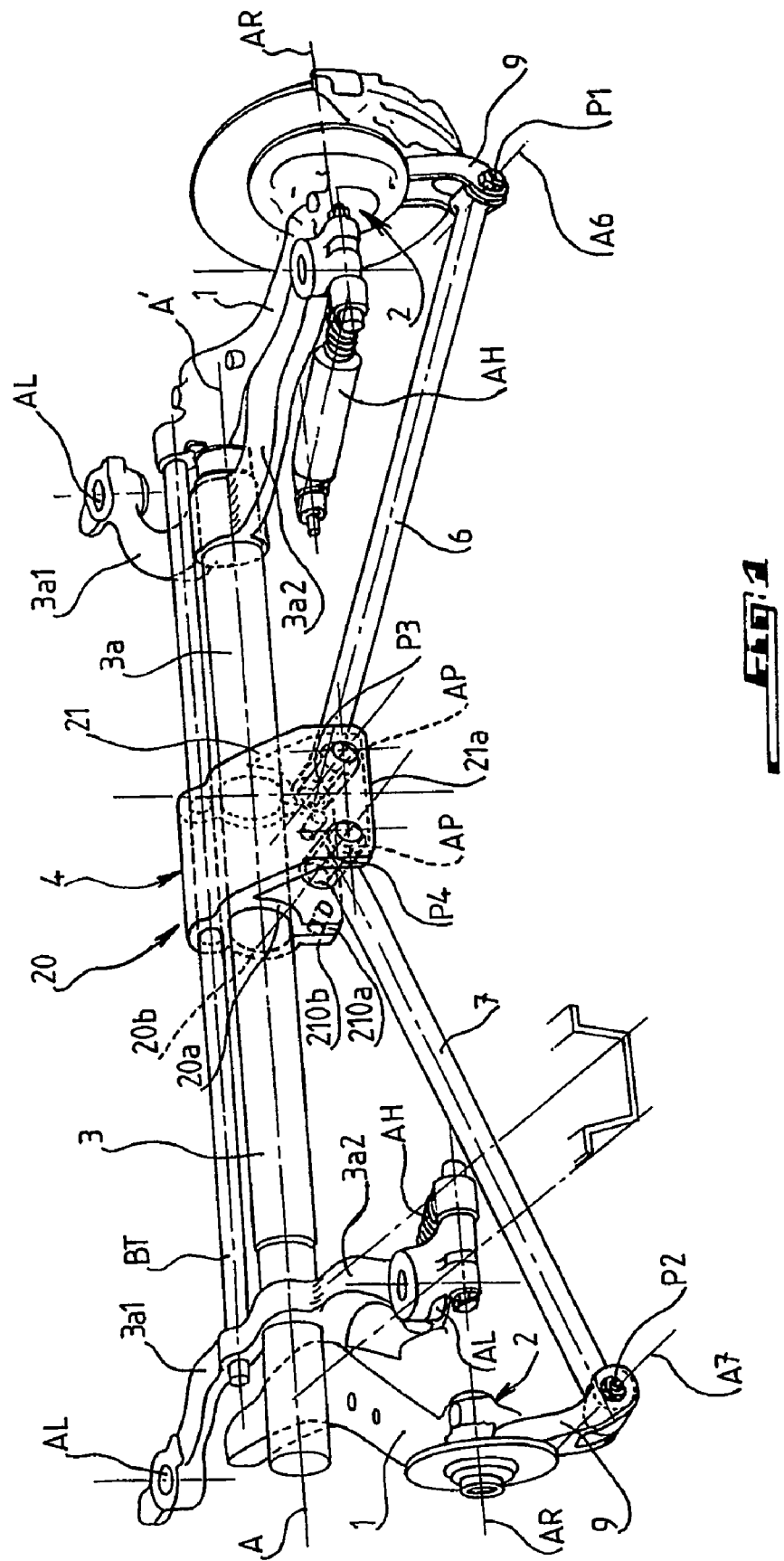
FIG. 1 is an oblique view of a rear axle assembly for an automobile according to the invention, according to a first embodiment of the support part.

FIG. 4 diagrammatically represents the different vertical oscillations of the rear wheels of the vehicle, for the purpose of explaining the operation of the rear axle assembly according to the invention;

FIG. 5 is a partial section similar to that of FIG. 2 and representing an embodiment variant of the retaining bar of the invention;

FIG. 6 is an enlarged section according to a second embodiment of the articulation of the end of a retaining bar according to the invention, FIG. 7 is a top view according to arrow VII of FIG. 6, FIG. 8 is a view identical to FIG. 1 according to a second embodiment of the support part; and FIG. 9 is a section of the support part according to the second embodiment illustrated in FIG. 8.

In reference to FIG. 1, the rear axle assembly for an automobile has two opposite longitudinally extended arms 1 for support of stub axles 2 of the rear wheels of the vehicle and which are connected together by tubular cross member 3 whose body 3a is attached to the vehicle body by two front legs 3a1 and two rear legs 3a2 integral with body 3a in order to form a fixed frame connected to the vehicle body by elastic connections AL in the form of blocks. Each extended arm 1 is mounted so as to pivot at the corresponding end of cross member 3 around transverse axis A-A' via a needle bearing (not represented) in order to allow oscillation of each rear wheel in a vertical plane.

The rear axle assembly moreover has two transverse bars BT capable of torsional deformation, a single one of which is represented, and which are situated on both sides of tubular cross member 3. One of the bars BT has an end anchored in the corresponding front 3a1 or rear 3a2 legs and its opposite end anchored in an end part integral with body 3a of cross member 3, while the other bar BT has an end anchored in the other rear leg 3a2 or front leg 3a1 and its opposite end anchored in an end part integral with body 3a of cross member 3 opposite to the first end part for anchoring the first bar BT.

Double acting hydraulic shock absorber AH is inserted between the end of each rear leg 3a2 and the corresponding extended arm 1.

According to the invention, the rear axle assembly also has two so-called retaining bars 6, 7, roughly transverse with respect to the longitudinal axis of the vehicle and each of which has an end attached to support part 4 by articulation AP, support part 4 being rigidly attached to tubular cross piece 3, as will be seen further on.

The other end of retaining bar 6, 7 is attached to the pivot of the corresponding rear wheel by a joint with a longitudinal axis A6 and A7 fixed to the end of stirrup piece 9 integral with the wheel pivot.

Each retaining bar 6, 7 is arranged in such a way as to have a variable length depending on the vertical oscillations in the driven and released state of the corresponding rear wheel and is inclined downward from its anchor point P3, P4 to support part 4.

In a first embodiment of support part 4, this part has body 20 for attachment to cross member 3, and piece 21, essentially in the form of a stirrup, for support of articulations AP of the two retaining bars 6, 7. Piece 21 is integral with attachment body 20 by its upper part. It is situated to the rear of cross member 3 relative to the normal direction of motion of the vehicle.

Attachment body 20 encloses tubular cross member 3 and possibly one or two torsion bars BT. Cross member 3 and bars BT therefore pass through attachment body 20 laterally. Attachment body 20 is attached to tubular cross member 3 by two flanges 210a and 210b, essentially in the form of plates, situated under cross member 3 in the vertical plane passing through the axis of tubular cross member 3. The flanges are pressed against one another by tightening means, for example, bolts. In the embodiment of the invention illustrated in FIG. 1, rear attachment flange 210a defines the front limb of stirrup-shaped piece 21.

Attachment body 20 has two half-shells 20a and 20b which respectively enclose cross member 3 from the rear and from the front. These two half-shells 20a and 20b are integral at their upper part and respectively have flanges 210a and 210b at their lower parts. As shown in FIG. 1, stirrup piece 21 has rear limb 21a in the form of a plate, parallel to attachment flange 210a and integral with rear half-shell 20a of attachment body 20.

Support part 4 is preferably a cast piece made of aluminum. It can also be machined, and the material used can be steel.

The axis of articulations AP of retaining bars 6 and 7 with support part 4 is essentially parallel to the longitudinal axis of the vehicle.

Each articulation AP is inserted between the two limbs of stirrup piece 21 and is connected thereto in a flexible manner, as described regarding the two embodiments of retaining bars 6 and 7 illustrated respectively by FIGS. 2, 3, 5 and 6, 7, or is connected by a ball-and-socket.

According to the first embodiment represented in FIGS. 2 and 3, each retaining bar 6, 7 has, at its end connected to support part 4, two telescoping tubular elements, respectively internal 6a, 7a and external 6b, 7b, in such a way as to vary the distance between anchor point P1, P2 of retaining bar 6, 7 to stirrup piece 9 of the corresponding wheel pivot and anchor point P3, P4 of the opposite end of retaining bar 6, 7 to support part 4. Anchor point P3, P4 can be an eccentric screw for adjusting the force on the wheel plane.

The end of internal telescoping tube 6a, 7a of the retaining bar is obstructed by cylindrical plug 10 force fit into tube 6a, 7a, and which has facing 10a for receiving the base of truncated conical block 11 made of a rubber-based material which is capable of axial deformation by compression.

The end of external telescoping tube 6b, 7b of retaining bar 6, 7 is also closed by cylindrical stop 12 situated facing plug 10 with interposition of rubber block 11 so as to allow block 11 to come to bear on stop 12 and be axially deformed by compression, as represented by dotted lines in FIG. 4, when each rear wheel in the driven state oscillates in a vertical plane.

Cylindrical stop 12 is maintained in the corresponding end of external tube 6b, 7b by crimping 5 of this tube.

The two telescoping tubes 6a, 7a and 6b, 7b are sealed from the exterior by external bellows shaped sleeve 13.

The end of external tube 6b, 7b extending for receiving stop 12 is flattened so as to form a part of smaller thickness supported by shaft 14 via elastic connection 15 consisting of a rubber sleeve integral with shaft 14. Shaft 14 is rigidly attached by one of its ends to rear limb 21a and by its other end to flange 210a. Sleeve 15 covers the whole length of shaft 14 between rear limb 21a and flange 210a. Sleeve 15 is also fixed in metallic sheath 16 attached at the flattened end of external tube 6b, 7b, transversely with respect to it.

Sleeve 15 can be attached to shaft 14 and to sheath 16 by an adhesive.

According to a variant, articulation AP can be a ball-and-socket type of joint 22.

The embodiment variant represented in FIG. 5 does not differ from that of FIG. 2 except by the presence of helical compression spring 19, which replaces the rubber block and is inserted between the two end stops 10 and 12.

FIG. 4 diagrammatically represents the oscillations of the rear wheel, and therefore of extended arms 1, around axis of rotation A-A' and which are symbolized by points AR starting from reference position 0. Thus, each rear wheel oscillates from the "driven" position (1) to the "released" position (2) around axis A-A', and anchor points P1 and P2, which are connected with the rear wheels, experience these oscillations as symbolized by (1') and (2') on either side of reference position (0') of P1, P2. The movements of points P1 and P2 lead to a variation of the length of lines P1, P4 and P2, P3, which respectively symbolize the two retaining bars 6, 7. Thus, each retaining bar 6, 7 as nearly as possible follows the theoretical travel path of the corresponding extended arm 1 in the "normal running" and "driven" part, in which the effects of centrifugal force are exerted in the direction of compression of bar 6, 7 and will therefore be taken up directly by this bar thanks to its telescoping part, the internal tube 6a, 7a of which will move in external tube 6b, 7b towards stop 12 so as to axially compress rubber block 11 on it.

By contrast, in the "released" part of the theoretical travel path of each extended arm 1, each anchor point P1, P2 will pull the corresponding retaining bar 6, 7 in the direction of its elongation, that is to say that internal tube 6a, 7a of the telescoping part of the retaining bar will move in external tube 6b, 7b away from stop 12.

The telescoping configuration of the end parts of the two retaining bars 6, 7 therefore makes it possible to control the plane of the rear wheel in order to reduce the deflection induced by the transverse forces and guarantees a good parallelism diagram of the wheels.

The second embodiment represented in FIGS. 6 and 7 fulfills the same function as the first embodiment above and will now be described.

According to this second embodiment, articulation AP connecting the end of each retaining bar 6, 7 to support part 4 has rubber sleeve 17 mounted coaxially on transverse shaft 14 and housed in metallic sheath 18 integral with and transverse with respect to the flattened end of retaining bar 6, 7. Sleeve 17 extends over the whole length of shaft 14 between rear limb 21a and flange 210a, and its longitudinal axis is thus parallel to the longitudinal axis of the vehicle.

Each sleeve 17 has two diametrically opposed internal cavities 17a extending in a direction parallel to the longitudinal axis of the sleeve, each one in the form of an arc-shaped hole. The two cavities 17a make possible radial deformation of sleeve 17 by compression when the corresponding rear wheel oscillates in the driven state, in which the effects of centrifugal force are exerted in the direction of compression of the corresponding retaining bar 6, 7.

A second embodiment of support part 4, constituting the preferred embodiment, is illustrated in FIGS. 8 and 9. The pieces fulfilling the same functions as in the first embodiment keep the same reference numbers and will not be described. This second embodiment differs from the first embodiment described above first in that attachment body 20 has two completely separated half-shells 20c and 20e which are integrated onto cross member 3 by two pairs of flanges 210c/210d and 210e/210f respectively belonging to half-shells 20c and 20e. Opposing flanges 210c and 210e are situated under cross member 3, in a plane passing through its axis A-A', slightly offset with respect to the vertical in the counter clockwise direction (FIG. 9). Opposing flanges 210d and 210f are situated above cross member 3, in a plane passing through its axis A-A', slightly offset with respect to the vertical in the clockwise direction. Flanges 210c/210e and 210d/210f are pressed against one another, for example, by bolts.

This second embodiment also differs from the preceding first embodiment by the fact that stirrup-shaped piece 21 has two parallel flat plates 21b and 21c, whose median plane B-B' passes through axis A-A' of cross member 3. This piece 21 is integral with half-shell 20c and extends from this half-shell towards the rear. Plates 21b and 21c are inclined slightly downward. The axis of articulation AP of retaining bars 6 and 7 to support part 4 is perpendicular to plane BB'.

This second embodiment of attachment body 20 can be used along with either of the two embodiments of retaining bars 6 and 7 (telescoping or provided with elastic connections with internal cavities), with either of the two embodiment variants of the flexible component in the case in which the retaining bars are telescoping (rubber block or helical spring), and with the embodiment variant in which articulation AP is a ball-and-socket joint.

The invention thus proposes a number of solutions making it possible to support all of the transverse forces exerted on the rear axle assembly and which pass directly to the vehicle body without exerting deformation stress on the elements of the rear axle assembly, that is to say the extended arms and/or the blocks for connecting them to the vehicle body.

The elongation of each retaining bar towards relaxation makes it possible to release the internal stresses which otherwise would prohibit the free oscillation of the rear axle assembly.

What is claimed is:

1. A rear axle assembly for an automobile including a vehicle body, having two longitudinally extended arms for supporting rear wheels of the automobile, connected together by a cross member attached to the vehicle body by front and rear legs connected to the vehicle body by elastic connections and mounted so as to pivot at corresponding ends of the cross member around a transverse axis, comprising a support part rigidly attached essentially in the middle of the cross member; and two essentially transverse retaining bars, each of which has one end attached to the support part by articulation and its opposite end attached to a corresponding wheel pivot by articulation, each retaining bar being arranged in such a way as to have a variable length depending on the vertical oscillations of a corresponding wheel, wherein the support part has a body for attachment to the cross member and a piece, essentially in the form of a stirrup for support of articulations of the two retaining bars, which is integral with the attachment body and situated to the rear of the cross member.

2. The rear axle assembly according to claim 1, wherein the attachment body encloses the cross member and is attached to the cross member by two flanges situated under the cross member in the vertical plane passing through the axis of the cross member, one of the attachment flanges defining one of the limbs of the stirrup-shaped piece.

3. The rear axle assembly according to claim 2, wherein the attachment body has two half-shells enclosing the cross member, and the stirrup-shaped piece has a wall behind the cross member that is integral with the rear half-shell of the attachment body.

4. The rear axle assembly according to claim 1, wherein the attachment body has two separate half-shells enclosing the cross member and which are attached to the cross member by two pairs of flanges respectively belonging to the two half-shells.

5. The rear axle assembly according to claim 4, wherein the stirred-shaped piece has two parallel flat plates whose median plane passes though the axis of the cross member.

6. The rear axle assembly according to claim 1, wherein each retaining bar has, at its end connected to the support part, two telescoping elements, an external one and an internal one, respectively comprising two fixed transverse end stops between which a flexible component is supported which can be compressed axially when the wheel oscillates vertically in the driven state.

7. The rear axle assembly according to claim 6, wherein the flexible component is a helical compression spring.

8. The rear axle assembly according to claim 6, wherein the flexible component is a truncated conical rubber block integral with the end stop of the internal telescoping element.

9. The rear axle assembly according to claim 6, wherein the external telescoping element of each retaining bar has an end, and the end of the external telescoping is connected to the support part by a corresponding elastic or ball-and-socket joint.

10. The rear axle assembly according to claim 1, wherein the articulation connecting each retaining bar to the support part is flexible and has a rubber-based sleeve with a longitudinal axis parallel to the longitudinal axis of the vehicle and having two diametrically opposed internal cavities allowing radial deformation of the sleeve during vertical oscillations of the corresponding wheel.

11. The rear axle assembly according to claim 10, wherein each of the cavities has the form, in cross section, of an arc-shaped hole.

12. The rear axle assembly according to claim 1, wherein the support part is a cast piece made of aluminum.

* * * * *